United States Patent [19]
Shore et al.

[11] 3,992,148
[45] Nov. 16, 1976

[54] HEAT TREATMENT OF PARTICULATE SOLID MATERIAL

[75] Inventors: David Teignmouth Shore, Banstead; Hugh Eddowes, Haywards Heath, both of England

[73] Assignee: The A.P.V. Company Limited, Crawley, England

[22] Filed: Feb. 20, 1975

[21] Appl. No.: 551,319

[30] Foreign Application Priority Data
Feb. 26, 1974  United Kingdom................. 8709/74

[52] U.S. Cl. ..................................... 21/94; 21/91; 21/93; 21/98; 34/135; 99/516; 259/14; 426/521

[51] Int. Cl.² ...................... A61L 3/00; B01F 9/02; B01F 15/02; A23B 4/00

[58] Field of Search ............ 21/94, 98; 99/294, 466, 99/516, 288, 289, 483, 532; 259/81, 88, 89, 14, 15; 426/498, 476, 520, 521; 134/22 C, 30; 34/135–137

[56] References Cited
UNITED STATES PATENTS

| | | |
|---|---|---|
| 1,019,538 | 3/1912 | Scott .................................... 21/98 |
| 2,062,330 | 12/1936 | Page et al. ...................... 426/521 X |
| 2,363,949 | 11/1944 | Fauver ................................. 259/88 |
| 2,628,080 | 2/1953 | Mack ..................................... 259/14 |
| 2,726,069 | 12/1955 | Thorstensson-Rydberg ..... 99/466 X |
| 2,795,404 | 6/1957 | Cornell ................................. 259/14 |
| 3,401,060 | 9/1968 | Watts .............................. 134/30 X |
| 3,526,547 | 9/1970 | Shock ............................. 134/22 C |
| 3,565,168 | 2/1971 | Powell et al. ................. 259/81 R X |

*Primary Examiner*—Norman Yudkoff
*Assistant Examiner*—Dale Lovercheck
*Attorney, Agent, or Firm*—Christel & Bean

[57] ABSTRACT

Apparatus for preparing sterilized particulate solid materials, comprising a sterilizing vessel mounted on hollow trunnions for rotation about a generally horizontal axis and shaped so as to provide a tumbling action on the solid material therein as it rotates, a fluid inlet leading via one of the hollow trunnions, a discharge valve at a point remote from the axis of rotation leading into a solids discharge duct passing out via one of the hollow trunnions, and a supply line for cleaning and sterilizing fluids passing via one of the hollow trunnions, whereby the discharge duct may be cleaned and sterilized in preparation for discharge while the vessel is rotating.

10 Claims, 2 Drawing Figures

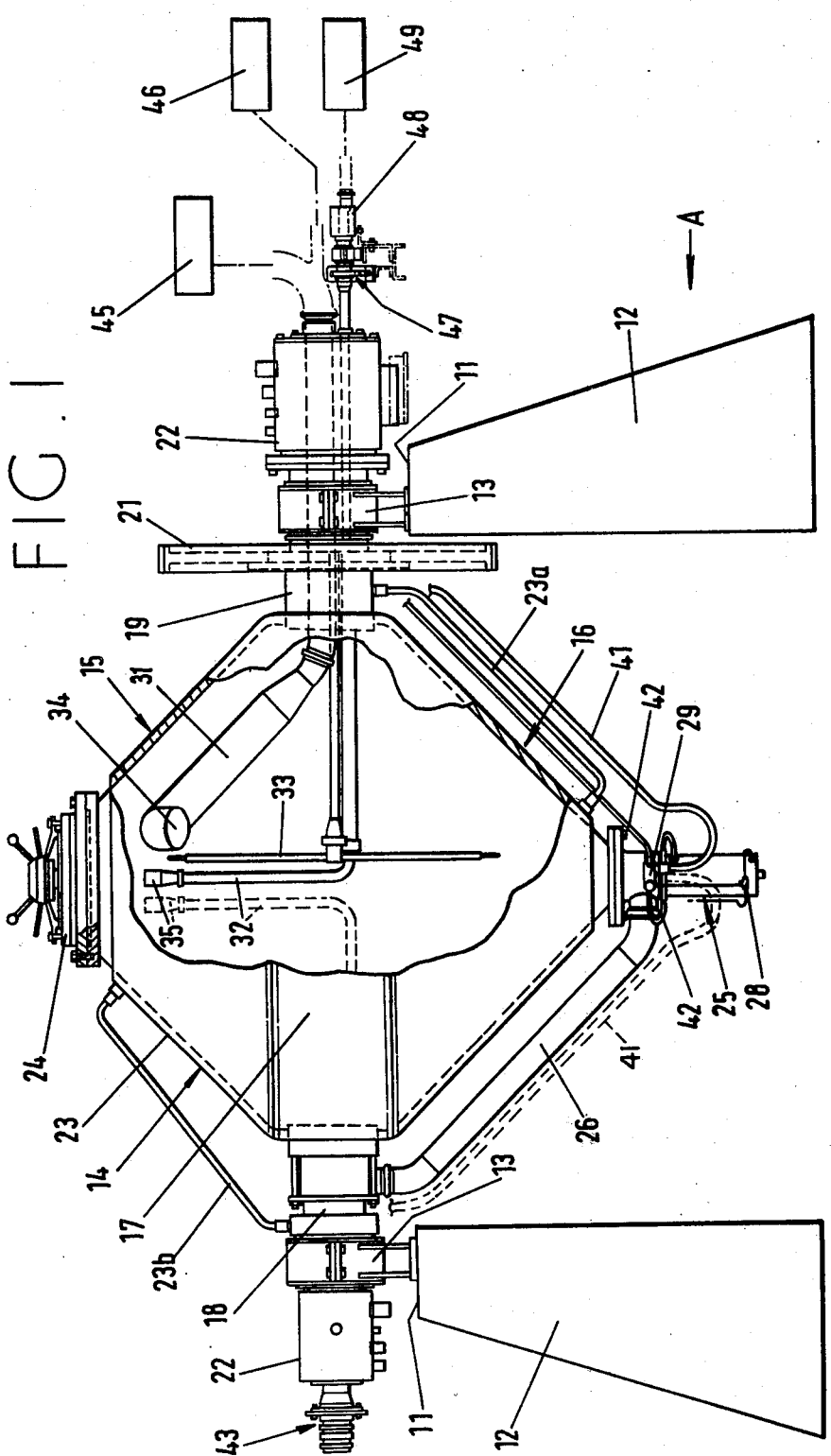

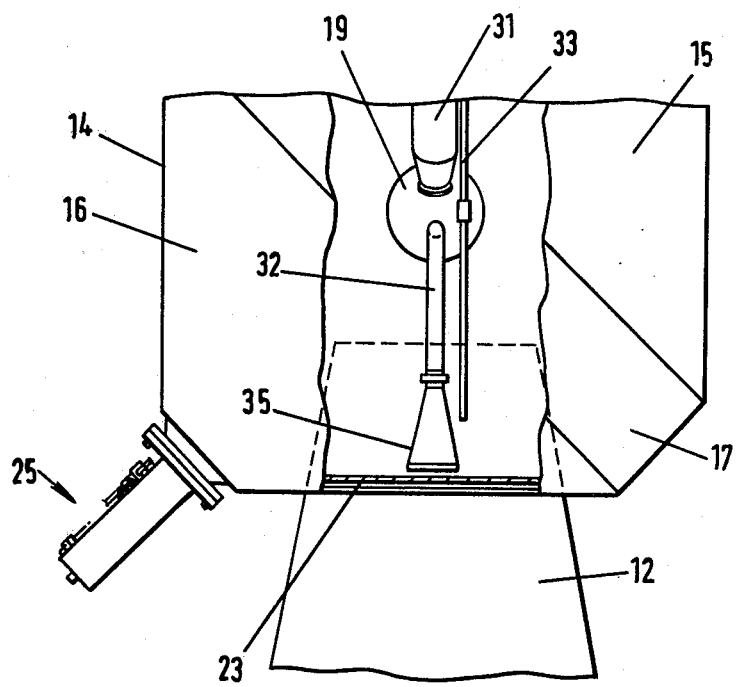

HEAT TREATMENT OF PARTICULATE SOLID MATERIAL

This invention relates to the heat treatment of particulate solid materials and more particularly to an apparatus for batch sterilization thereof.

In the treatment of materials, particularly food materials, for aseptic canning or other sterile packaging, it is clear that the treatment process must sterilize the material and precautions must be taken to maintain this sterility until the material is finally packaged.

Various continuous processes have been proposed for sterilizing solid materials and passing them direct to sterile packaging systems, such as aseptic canners, or to aseptic storage tanks. However, it is in many ways advantageous to process on the basis of a batch system, particularly as this allows a positive control of the sterilization time.

Various forms of apparatus are known for batch heat treatment of particulate solids, but none of these is suitable in itself for batch sterilization.

It has been found that reliable sterilization can be achieved in an apparatus comprising a vessel rotatable on hollow trunnions about a generally horizontal axis and shaped so that during rotation the solid material is subjected to a tumbling action caused by the constantly changing shape of the portion of the vessel occupied by the solid material. This tumbling action not only aids the exposure of the particles to heat, which may be derived from steam fed into the vessel and/or conducted through the wall of vessel, e.g. from a steam jacket but it also enables the vessel to be used for blending, e.g. with a sauce, after sterilization of the solids is completed.

Vessels of this type are known in the art of blending and drying, but these are normally loaded and emptied through a single access door remote from the axis of rotation for gravity feed. Such gravity discharge through an open door would clearly not be suitable for sterilized solid material.

The present invention consists in apparatus for preparing sterilized particulate solid material, comprising a sterilizing vessel mounted on hollow trunnions for rotation about a generally horizontal axis and shaped so as to provide a tumbling action on the solid material therein as it rotates, a fluid inlet leading via one of the hollow trunnions, a discharge valve at a point remote from the axis of rotation leading into a solids discharge duct passing out via one of the hollow trunnions, and a supply line for cleaning and sterilizing fluids passing via one of the hollow trunnions, whereby the discharge duct may be cleaned and sterilized in preparation for discharge while the vessel is rotating.

Preferably, the supply line passes through the same hollow trunnion as the discharge duct.

The vessel is preferably jacketed so that steam or cooling water may be circulated through the jacket.

The fluid inlet may be stationary within its hollow trunnion and may consist of a pipe cranked upwardly into the head space near the top of the vessel.

A vent and fluid discharge pipe may be led in via the same trunnion as the fluid inlet and this pipe may be normally static but adjustable in order to perform its dual function.

In a preferred form, the vessel consists of a pair of conical portions joined at their bases by a short cylindrical or spherical portion. The axis of rotation is diametrical to the cylindrical portion and the discharge valve is at the apex of one conical portion. The apex of the other conical portion may then have an access and loading door.

The invention will be further described with reference to the accompanying drawings, in which:

FIG. 1 is a side elevation, partly in section, of an apparatus constituting a preferred embodiment of the invention; and FIG. 2 is a scrap elevation on the arrow A, partly in section, showing the vessel in a different position.

The drawings show a pair of support platforms 11 mounted on frames 12 and carrying bearing blocks 13. A sterilization vessel 14 consists of a pair of 90° conical portions 15 and 16 joined at their bases by a cylindrical portion 17. The vessel 14 is provided with hollow trunnions 18 and 19 mounted in the bearing blocks 13 so that the vessel is rotatable about a horizontal axis which is diametral of the cylindrical portion 17. A drive pinion is shown at 21. Each trunnion 18 and 19 is provided with a manifold assembly 22 whereby service lines for air, water, steam and electric power may be provided to the rotating vessel 14. For clarity of illustration, the details of the connections in these manifolds are not shown. The vessel 14 is provided with a jacket 23 to which steam or cooling water may be fed as required via lines of which one is illustrated at 23a. An outlet line is shown at 23b.

Rotary seals adjacent to the product are traced by a sterilizing medium such as steam and also distributed via lines indicated at 42 to valve stem seals.

The apex of the conical portion 15 is provided with an access and loading door 24, and the apex of the conical portion 16 with a pneumatically operated solids discharge valve 25 connecting to a discharge conduit 26 solid with the vessel 14 and passing coaxially along the hollow trunnion 18 to a rotary aseptic seal 43 for connection with a stationary conduit leading to an aseptic storage tank or an aseptic packaging apparatus. Steam for sterilizing the downstream zones of the valve 25 and the conduit 26 is obtained from the line 41 via a pneumatically operated valve 29. The conduit 26 may be passed within the jacket if required. A pneumatic controller for the valves 25 and 29 is indicated at 28.

The trunnion 19 carries essentially static elements in the form of a steam and other fluid inlet pipe 31, a vent and outlet pipe 32, and a temperature probe 33. The pipe 31 extends away from the axis of rotation into the headspace above the material in the vessel 14, and then has an outlet end 34 bent over to prevent drips and a slow liquid flow down the outside of pipe 31. The steam and other fluid sources are indicated at 45 and 46.

The pipe 32 extends generally parallel with the axis of rotation, and then passes through an elbow bend so as to extend at 90° to its original path. As illustrated, it has a filter 35, shown as of the bell mouth type, on its end. Its position may be adjusted to the position shown in FIG. 2 as required by means of a drum shown at 47, and also the filter 35 is removable, and may be replaced with a spray ball or other nozzle set for purposes of cleaning the inside of the vessel 14.

The outer end of the pipe 31 is connectable to the steam source 45 for sterilization, and it is also connectable to sources, indicated at 46, of sterile air or other suitable sterile gas or gas mixture (referred to hereinafter as sterile gas) and a supply of liquid additive to be blended with the sterilized material. The pipe 32 is connected via a sterilizing biological filter 48 for its venting function, in order that air drawn in during possible cooling phases of the cycle shall not destroy the sterility. When in the position of FIG. 2, it may be used as a discharge line by-passing the filter 48 for the bulk of the liquid phase in the vessel to a hopper 49.

In order to control the time of sterilization there is provided a $F_0$ meter which integrates the sterilization temperature with time and automatically controls the apparatus to finish the sterilization step when the preset value, e.g. 20 minutes at 250° F (or equivalent sterilization value) has been reached.

The vessel may be used for sterilization and also for post-sterilization treatment, such as blending with a sauce supplied via the pipe 31. Before discharge of the solids, whether or not blended, via valve 25, the downstream section of this valve and the conduit 26 must be sterilized by steam supplied via the valve 29 and line 41, and this can be carried out while the vessel is rotating. In order to discharge via the valve 25, the apex of the conical portion 16 must be below the axis of rotation so that the material can drain towards the outlet with the valve 25. Sterilized air under pressure is supplied via pipe 31 to ensure that the discharged material passes along conduit 26 and out through the trunnion 18, into a suitable sterile hopper 49 supplying sterile packaging or canning equipment.

By way of example, the vessel illustrated is intended to have an internal diameter of about 6 feet or 2 meters and may take a batch of food produce about 1½ tons (or 1500 kg) in weight. The intended speed of rotation is for example between 3 and 10 rpm. Also rotation may be intermittent, e.g. one revolution at 5 r.p.m. once every minute.

It will be noted that the pipe 32 is offset from the axis of rotation.

The offset provides a clearance between the filter or spray ball and the vessel when the pipe is in the upright position, but in the down position the filter is as close a practicable to the vessel wall so that the maximum amount of cooking liquor is drained off after cooling. It will also be appreciated that this leads to a degree of adjustability of the distance of the spray ball from the surface to be cleaned, by adjusting the angular position of the pipe 32.

In one example of its use the apparatus is operated to produce a sterile food product containing discrete particles of similar size such as ¾ inch diced meat and vegetables in a sauce. This is achieved by:

1. Loading the particulates into the vessel and adding water or liquor drained from a previous batch;
2. Starting the vessel rotating continuously or intermittently as required;
3. Admitting steam through pipe 31 and continually purging through 32 (in the upright position) until the temperature of the particulates and cooking liquor has reached the required value and been held for the required time;
4. Shutting off the steam and replacing with pressurised sterile air whilst cooling, by admitting water to the jacket, to the required product temperature;
5. Stopping rotation, inverting pipe 32 and blowing out the cooking liquor by the air pressure in the head space;
6. Returning pipe 32 to the upright position and admitting sterile sauce through 31. This sauce will have been processed by any of the established methods and held in a sterile receiver until required. Air is vented through 32 during this operation to maintain the pressure constant;
7. Rotating the vessel to mix or blend the sauce and particulates and then stopping with the discharge valve 25 in the bottom position;
8. Opening valve 25 and blowing the product through the discharge line 26 to the filler hopper; and
9. Shutting valve 25 and isolating the filler hopper, opening the loading door, and repeating the cycle.

Two big advantages of the apparatus and process are that every particulate solid receives exactly the same heat treatment and this heat treatment can be recorded.

Various modifications may be made within the scope of the invention. Thus, the drive pinion 21 may be replaced by a suitable chain drive. Also, the cylindrical portion 17 may be part spherical or otherwise curved to cross-section.

Attention is drawn to co-pending application Ser. No. 551,320 in the name of David Teignmouth Shore and Hugh Eddowes filed simultaneously with this application, entitled: "Improvements in or relating to the sterilization of particulate solid materials" which deals with sterilization methods utilizing the apparatus as hereinbefore described.

We claim:
1. In apparatus for preparing sterilized particulate solid material, comprising a sterilized vessel mounted on a pair of hollow trunnions for rotation about a generally horizontal axis and shaped so as to provide a tumbling action on particulate solid material therein as it rotates, a fluid inlet leading via one of said hollow trunnions, a source of cleaning and sterilizing fluids: the improvement that the vessel includes a discharge valve connected to the vessel at a point remote from the axis of rotation leading into a solids discharge duct passing out of the vessel via one of the hollow trunnions, and a supply line connected to said source and in fluid flow communication with the discharge valve, said supply line passing via one of said hollow trunnions for conveying cleaning and sterilizing fluids to the discharge duct, whereby the discharge duct may be cleaned and sterilized in preparation for discharge while the vessel is rotating.

2. Apparatus as claimed in claim 1, in which the supply line for cleaning and sterilizing fluids and the discharge duct pass via one of said hollow trunnions.

3. Apparatus as claimed in claim 1, comprising a jacket on the vessel.

4. Apparatus as claimed in claim 1, in which the fluid inlet is stationary within the hollow trunnion.

5. Apparatus as claimed in claim 4, in which the fluid inlet consists of a pipe cranked upwardly into the head space near the top of the vessel.

6. Apparatus as claimed in claim 1, further comprising a vent and fluid discharge pipe led in via the same trunnion as the fluid inlet.

7. Apparatus as claimed in claim 6, in which the vent and fluid discharge pipe is normally static in operation but is adjustable between vent and fluid discharge functional positions.

8. Apparatus as claimed in claim 1, in which the vessel consists of a pair of conical portions each having an apex and joined at their bases by a short linking portion in the form of a hollow body having an axis of rotation.

9. Apparatus as claimed in claim 8, in which the axis of rotation of the vessel is diametrical of the linking portion and the discharge valve is at the apex of one conical portion.

10. Apparatus as claimed in claim 9, in which the apex of another conical portion has an access and loading door.

* * * * *

UNITED STATES PATENT AND TRADEMARK OFFICE
CERTIFICATE OF CORRECTION

PATENT NO. : 3,992,148
DATED : November 16, 1976
INVENTOR(S) : David Teignmouth Shore and Hugh Eddowes It is certified that error appears in the above—identified patent and that said Letters Patent are hereby corrected as shown below:

Claim 1, line 2 "sterilized" should be --sterilizing--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*